United States Patent [19]

Ehrhart et al.

[11] 4,304,879
[45] Dec. 8, 1981

[54] NON-CRYSTALLIZING ACRYLATED POLYESTERS BASED ON ISOPHTHALIC ACID

[75] Inventors: Wendell A. Ehrhart, Hellam; David A. Smith, Wrightsville, both of Pa.

[73] Assignee: Armstrong World Industries, Inc., Lancaster, Pa.

[21] Appl. No.: 198,849

[22] Filed: Oct. 20, 1980

[51] Int. Cl.³ .............................................. C08L 67/00
[52] U.S. Cl. ................................. 525/35; 204/159.15; 204/159.19; 525/10; 525/21; 525/23
[58] Field of Search ..................... 525/10, 21, 23, 35; 204/159.15, 159.19

[56] References Cited

U.S. PATENT DOCUMENTS 3,924,023  12/1975  Boraman et al. .................... 428/334

Primary Examiner—J. Ziegler

[57] ABSTRACT

A family of non-crystallizing acrylated polyester resins are described in which the polyesters are formed by reacting a mixture of 100 mol percent dicarboxylic acids of which 50 to 100 mol percent is isophthalic acid; 0 to 25 mol percent is terephthalic acid; and 0 to 50 mol percent is one or more dicarboxylic acids other than isophthalic or terephthalic; with an excess of two or more primary glycols, the maximum mol percent of any one glycol being dependent on the amount of isophthalic acid with the upper limit being established by the line A-B of the FIGURE of the Drawing.

2 Claims, 1 Drawing Figure

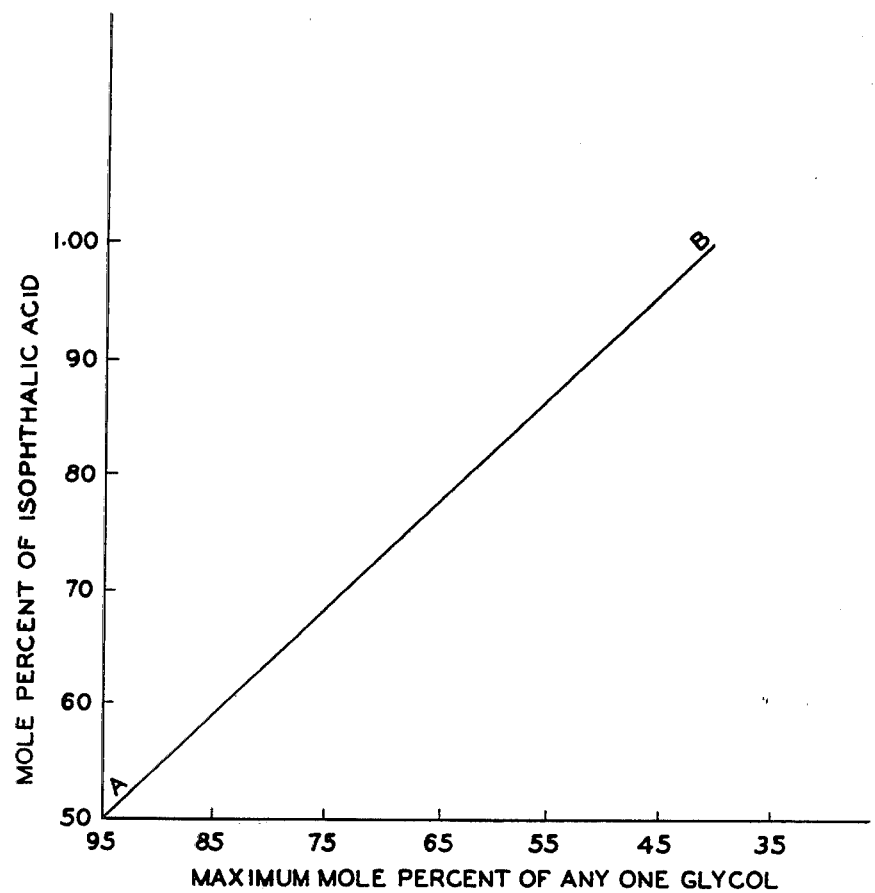

NON-CRYSTALLIZING ACRYLATED POLYESTERS BASED ON ISOPHTHALIC ACID

BACKGROUND OF THE INVENTION

1. Field of the Invention

This invention relates to radiation curable non-crystallizing acrylated polyesters.

2. Description of the Prior Art

Acrylated polyesters have been suggested as candidate resins for radiation curable systems, particularly for use in UV curable coatings, as, for example, in U.S. Pat. No. 3,924,023. In order to achieve desired physicals, we have found it to be desirable to work with UV curable coatings containing polyesters based on isophthalic acid. Because of an inherent tendency of such resins to crystallize we have found it necessary to modify the polyesters to provide non-crystallizing acrylated prepolymers usable under conventional processing conditions.

SUMMARY OF THE INVENTION

In order to develop a family of acrylated polyester resins curable by radiation and exhibiting desired shelf life, we have discovered that it is necessary to provide, for reaction with acrylic acid, a polyester having a hydroxy member of from about 50 to 100, the polyester being the reaction product of a mixture comprising 100 mol percent of dicarboxylic acids of which 50 to 100 mol percent is isophthalic acid; 0 to 25 mol percent is terephthalic acid and 0 to 50 mol percent is one or more dicarboxylic acids other than isophthalic or terephthalic; with an excess of two or more primary glycols, the maximum mol percent of any one glycol lying in the compositional region to the right of line A-B in the FIGURE of the Drawing.

BRIEF DESCRIPTION OF THE DRAWING

The FIGURE sets forth the workable compositions in accordance with the invention, the non-crystallizing acrylated polyesters having compositions falling within the area to the right of the line A-B with the maximum percent of any one glycol falling on line A-B and being dependent on the relative content of isophthalic acid.

DETAILED DESCRIPTION

As stated in the Summary of the Invention, non-crystallizing polyesters in accordance with this invention are based on the reaction products of isophthalic acid and one or more dicarboxylic acids with two or more primary glycols. We have found that a direct relationship can be established for the maximum mol percent of any one glycol utilized in the polyester forming reaction and that this relationship depends on the amount of isophthalic acid utilized. Basically, the polyesters which are subsequently acrylated are the reaction products of a mixture of 100 mol percent of dicarboxylic acids and an excess of primary glycols. Of the acids, 50 to 100 mol percent is isophthalic acid, 0 to 25 mol percent is terephthalic acid and 0 to 50 mol percent is one or more dicarboxylic acids other than isophthalic or terephthalic such as phthalic, adipic, azelaic or tetrahydrophthalic acids. These acids are reacted with two or more primary glycols. Examples of glycols usable in the polyester forming reaction include ethylene glycol; 1,3 propanediol; 1,4 butanediol; 1,5 pentanediol, neopentyl glycol and trans-cyclohexanediethanol. The maximum mol percent of any one glycol has been found to be dependent on the amount of isophthalic acid reactant. This relationship is set forth in the FIGURE of the Drawing, the mol percent content for isophthalic acid being plotted along line A-B against the maximum mol percent content for any one primary glycol. Compositions having the desired non-crystallivity fall in the compositional area to the right of line A-B in the FIGURE.

Specific embodiments of the invention are illustrated in the following examples.

POLYESTER PREPARATION

Polyester 1 through 9 (see Tables IA & IB) were prepared by charging all ingredients indicated to a 5 liter, 5-necked flask with a glass helicies packed, steam heated partial condenser (upright) with still head and total condenser above. The molar formulas shown were converted to grams and scaled to 3500 g of reactants. In addition to the ingredients listed in the Tables, 0.75±0.25% of dibutyltin bis lauryl mercaptide catalyst and 1 drop of a silicone antifoam sold by Crucible Chemical Co. under the trade name Foamkill 8R, were employed. The flask was further equipped with mantle, stirrer, thermometer, temperature controller and gas inlet tube. The ingredients were heated gradually with stirring to 220°±5° under nitrogen and held at this temperature until the acid number fell below 1.5±0.5. The nitrogen flow was gradually increased, after about 70% of the theoretical water was obtained, to about 700 ml/minute to help remove the water of esterification and drive the reversible equilibrium reaction to completion.

TABLE IA

| POLYESTER MOLAR FORMULAS | | | | | |
|---|---|---|---|---|---|
| INGREDIENTS, ETC./# | 1 | 2 | 3 | 4 | 5 |
| Isophthalic acid | 20 | 20 | 20 | 15 | 14 |
| Phthalic anh. | — | — | — | 5 | 6 |
| 1,6 hexanediol | 4 | 8 | 7 | 6.1 | 5.7 |
| Cyclohexanedimethanol | — | — | 8 | 9 | 10 |
| Neopentyl glycol | 21 | 17 | 10 | 10.5 | 10 |
| Hydroxyl eq. wt. | 634 | 561 | 706 | 614 | 544 |

TABLE IB

| POLYESTER MOLAR FORMULAS | | | | |
|---|---|---|---|---|
| INGREDIENTS, ETC./# | 6 | 7 | 8 | 9 |
| Isophthalic acid | 13 | 10 | 13 | 15 |
| Phthalic anhydride | 7 | 10 | 7 | — |
| Terephthalic acid | — | — | — | 5 |
| 1,6 hexanediol | 13.3 | 16.6 | 16 | 6.7 |
| Cyclohexanedimethanol | 9 | 1 | — | 8.5 |
| Neopentyl glycol | 2 | 7 | — | 10.5 |
| Ethylene glycol | — | — | 11 | — |
| Hydroxyl Eq. Wt. | 780 | 664 | 626 | 579 |

ACRYLATED POLYESTER RESIN PREPARATION

"Acrylation" of the polyesters was carried out by charging 1.2 to 1.5 equivalents of acrylic acid per equivalent of polyester, to an appropriately sized 4-necked flask containing the molten polyester. Sulfuric acid catalyst (0.24 parts per hundred parts resin [phr]) was used and, except for preparation of resins 6A and 7A of Table IIB, various aliphatic hydrocarbon solvents (15 to 20 phr) were used to help carry off the water of esterification by holding the mixture at reflux and using a Barrett trap to remove the water and return the solvent. Some xylene was also used in 4A to help lower the viscosity. Sufficient aliphatic solvent was maintained (solvent added or removed as necessary) to hold the batch temperature at 95°–110° C. The aqueous distillates were monitored to determine the extent of reaction and reactions were terminated when 90–98% of the theoretical water was obtained. Termination consisted of (after cooling to 90°) the addition of 1.3±0.2 equivalents of a base per equivalent of sulfuric acid originally employed. At this point, any diluents, such as 2-ethylhexyl acrylate, were added and the flask was evacuated to 40–50 mm of Hg to remove the solvents. Quick cooling produced resins, in all cases, which were clear to slightly translucent, pourable liquids at room temperature. Slow cooling, however, resulted in crystallization (solidification) of 1A and 2A which are outside the limits of the invention. The quick cooled resins could all be coated onto glass and cured via heat (sticky surfaces due to oxygen inhibition) and/or UV light to clear, flexible plastics if peroxides and/or photoinitiators were stirred in and they were used quickly (this would be impractical to impossible in most production situations). Those formulations falling outside the invention limits (1A and 2A) soon (less than 2 days) solidified to opaque solids on standing at room temperature and would require a tedious and difficult (could cause gellation especially when large volumes are involved) reheating process if they were to be used thereafter. Formulations on or near the line in the graph (such as 3A) may remain liquid and clear longer (up to about 2 weeks if kept under 75°), but eventually do crystallize, become opaque and mushy and would be difficult to pour or pump and thus to reheat. Some of the remaining formulations, which lie well to the right of the line, are completely stable liquids, however, others do become cloudy after prolonged storage indicating some crystallization. They remain, however, pourable and coatable and could be returned to their original condition as they are used, by pumping them through a heat exchanger on their way to the coater.

As noted above, formulations 6A and 7A were prepared slightly differently from the others. These reactions used only toluene solvent and were run at 105° for 7 hours using a nitrogen gas flow of 500 ml/min. per 1000 g of reactants. Water was collected and toluene returned during this time via a Barrett trap, however, the reactions were not monitored by the aqueous distillates. Hydroxyl determinations on the final products confirmed that more than 70% of the hydroxy groups had been esterified.

TABLE IIA

"ACRYLATED POLYESTER RESIN" FORMULAS
(Parts by Wt.)

| INGREDIENTS, ETC./# | 1A | 2A | 3A | 4A | 5A |
|---|---|---|---|---|---|
| Polyester #1 | 366 | — | — | — | — |
| Polyester #2 | — | 300 | — | — | — |
| Polyester #3 | — | — | 2488 | — | — |
| Polyester #4 | — | — | — | 935 | — |
| Polyester #5 | — | — | — | — | 658 |
| Acrylic Acid | 54 | 46.2 | 333 | 138 | 130 |
| Xylene | — | — | — | 51 | — |
| Aliphatic solvent | Ligroine | Ligroine | Ligroine | Ligroine | Ligroine |
| Hydroquinone (HQ) | .0675 | .0575 | .456 | .145 | — |
| Monomethyl ether of HQ | — | — | — | .073 | .200 |
| Nitrobenzene | .0225 | — | .152 | — | — |
| Base | $C_aO$ | $C_aO$ | $C_aO$ | $C_aO$ | $C_aO$ |
| 2-Ethylhexyl acrylate | 180 | 115 | 406 | 377 | 240 |
| Initial R.T. Visc. (cps) | | 1,700 | 5,800 | 2,500 | 14,100 |

TABLE IIB

"ACRYLATED POLYESTER RESIN" FORMULAS
(Parts by Wt.)

| INGREDIENTS, ETC./# | 6A | 7A | 8A | 9A |
|---|---|---|---|---|
| Polyester #6 | 936 | — | — | — |
| Polyester #7 | — | 1041 | — | — |
| Polyester #8 | — | — | 569 | — |
| Polyester #9 | — | — | — | 930 |
| Acrylic acid | 115 | 144 | 98 | 144 |
| Toluene | 165 | 237 | — | — |
| Aliphatic solvent | — | — | Heptane | Isopar-C |
| Hydroquinone (HQ) | .114 | .116 | .045 | .218 |
| Monomethyl ether of HQ | .228 | .232 | .140 | — |
| Base | $M_gO$ | $M_gO$ | $C_aO$ | MDA |
| 2-Ethylhexyl acrylate | — | — | 3.3 | 377 |
| Isodecyl acrylate | 330 | — | — | — |
| Hexandiol diacrylate | 28 | — | — | — |
| Initial R.T.Visc.(cps) | 5,600 | 113,000 | 230,000 | |

What is claimed is:

1. A non-crystallizing acrylated polyester comprising the reaction product of acrylic acid and a hydroxy terminated polyester having a hydroxy number of from about 50 to 100 and wherein greater than 70 percent of the hydroxyl groups have been reacted with acrylic acid, said polyester being the reaction product of:
    (a) a mixture of 100 mol percent dicarboxylic acids of which:
        (1) 50 to 100 mol percent is isophthalic acid;
        (2) 0 to 25 mol percent is terephthalic acid; and
        (3) 0 to 50 mol percent is one or more dicarboxylic acids other than (1) or (2); with
    (b) an excess of two or more primary alcohols, the maximum mol percent of any one glycol being dependent on the amount of isophthalic acid with the upper limit being established by the line A-B of the FIGURE of the Drawing.

2. A photopolymerizable coating composition comprising the acrylated polyester of claim 1 and an effective amount of a photopolymerization catalyst.

* * * * *